T863007

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JUNE 24, 1969

863 O.G. 1000

727,699

SULFURIC ACID-POLY(VINYLAROMATIC SULFONIC ACID) GEL FOR DRY CHARGE LEAD-ACID STORAGE BATTERY

Harold H. Roth, Bay City, and Roy C. Kirk, Midland, Mich., assignors to The Dow Chemical Company, Midland, Mich., a corporation of Delaware

Filed May 8, 1968. Published June 24, 1969
Int. Cl. H01m *39/04*
U.S. Cl. 136—157
No Drawing. 8 Pages Specification

A water-soluble, high molecular weight, essentially linear poly(vinylaromatic sulfonate) resin equilibrated with 70–80% aqueous sulfuric acid yields a stable solid gel useful as a solid electrolyte for a dry charge lead-acid storage battery. The battery is activated by addition of water.